United States Patent [19]

Holce et al.

[11] Patent Number: 4,536,754

[45] Date of Patent: Aug. 20, 1985

[54] MAGNETICALLY RETAINED CONNECTING CABLE INCORPORATING MAGNETICALLY OPERATED SWITCH

[75] Inventors: Thomas J. Holce, Portland; Charles M. Huckins, Tigard, both of Oreg.

[73] Assignee: Sentrol, Inc., Portland, Oreg.

[21] Appl. No.: 494,345

[22] Filed: May 13, 1983

[51] Int. Cl.³ .............................................. G08B 13/14
[52] U.S. Cl. ...................... 340/568; 335/207
[58] Field of Search ............... 340/568; 335/205, 206, 335/207, 285

[56] References Cited

U.S. PATENT DOCUMENTS

| | | | |
|---|---|---|---|
| 3,414,853 | 12/1968 | Motis | 335/207 |
| 3,426,166 | 2/1969 | Canceill | 200/61.62 |
| 3,898,641 | 8/1975 | Banner | 340/568 |
| 4,011,555 | 3/1977 | Pearce | 340/568 |
| 4,213,110 | 7/1980 | Holce | 335/207 |
| 4,234,879 | 11/1980 | Baker | 340/568 |

FOREIGN PATENT DOCUMENTS 2621268  11/1977  Fed. Rep. of Germany .

*Primary Examiner*—James L. Rowland
*Assistant Examiner*—Jeffery A. Hofsass

[57] ABSTRACT

A connecting and sensing device and a method for its use in a system for electrically monitoring physical security, including a magnetically operated switch, such as an encapsulated magnetic reed switch, and a quantity of ferromagnetic material located in a fixed position relative to the magnetically operated switch. The switch is connected electrically to an alarm system control circuit and is physically restrained by a flexible cable or the like. An actuating magnet may be attached either to an object whose unauthorized removal is to be detected, or to a fixed object. The actuating magnet is held within a holder including a cavity which permits the magnetically actuated switch and ferromagnetic material to be placed in a predetermined location wherein a magnetic field of a desired polarity and strength produces a desired condition in the magnetically operated switch. The switch is retained in the desired location relative to the actuating magnet by the magnetic attraction between the actuating magnet and the ferromagnetic material. Unauthorized removal of the object being monitored by the use of the sensor results in the ferromagnetic material and the magnetically operated switch being pulled away from the actuating magnet, causing the switch to produce an electrically detectable change of state.

19 Claims, 8 Drawing Figures

U.S. Patent  Aug. 20, 1985  Sheet 1 of 3  4,536,754
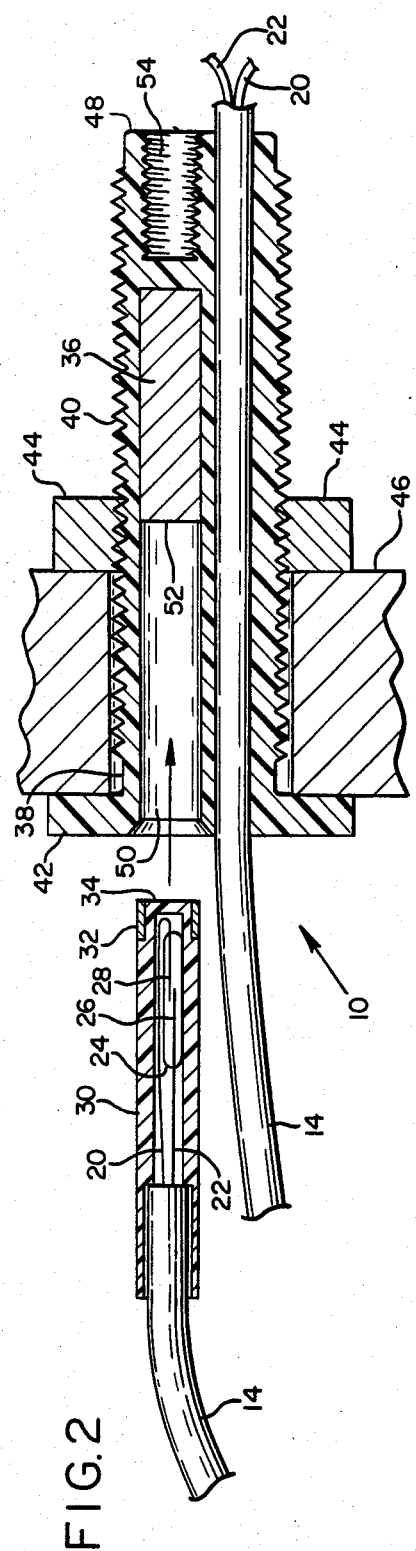
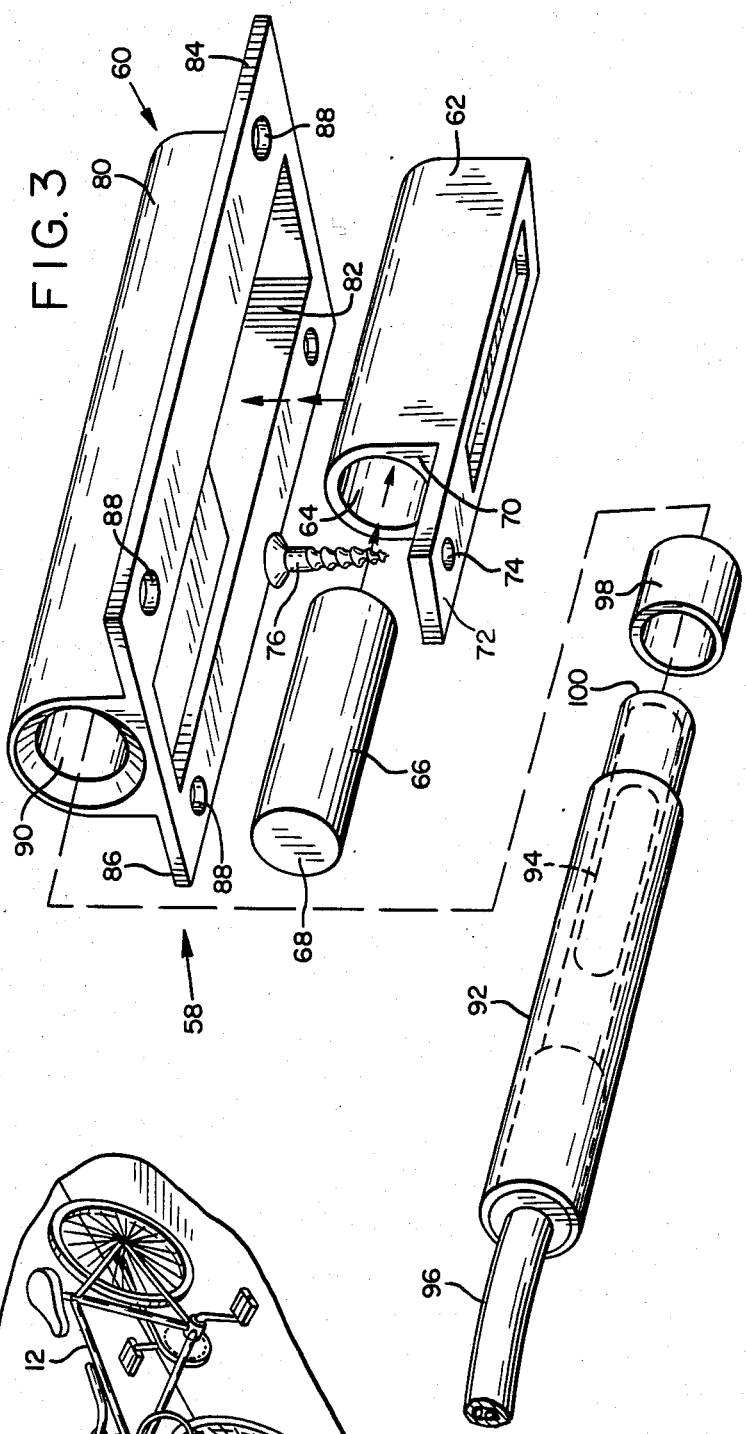
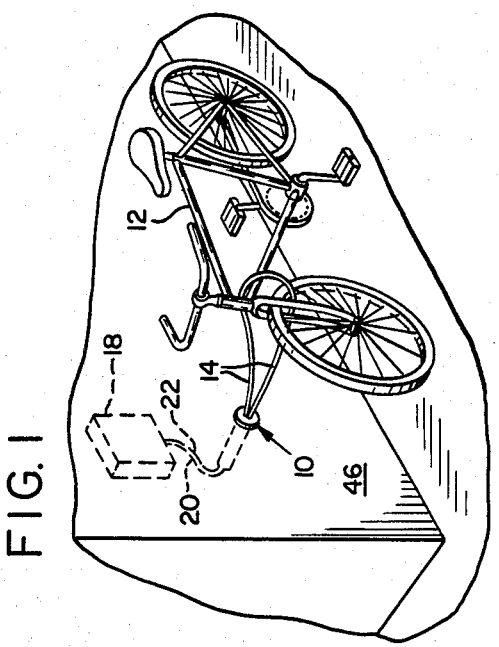

MAGNETICALLY RETAINED CONNECTING CABLE INCORPORATING MAGNETICALLY OPERATED SWITCH

BACKGROUND OF THE INVENTION

The present invention relates to improvements in sensors for use in physical security alarm system circuits, and particularly to a magnetically retainable connector cable incorporating a magnetically operated switch for incorporation in an alarm system for detection of unauthorized removal of an object from its proper location.

It has long been known to use magnetically operated proximity switches in security systems to detect unauthorized opening of doors, windows, gates, and the like. Typically, a magnetically operated switch such as a magnetic reed switch is fixedly mounted on a stationary structure and a permanent magnet is appropriately mounted on the movable window, door, or gate. When the movable object is in a predetermined position, the magnet actuates the switch, appropriately opening or closing an electrical circuit connected to an alarm system control device designed to respond appropriate. The usefulness of such previously known magnetically operated switch assemblies has depended upon the ability to mount an actuating magnet in a position where it will reliably actuate a magnetically operated switch whenever the door, gate, etc., is in an appropriate position. Such a system depends, however, on the door, etc., returning predictably to a position which must usually be within about an inch of a reference location.

In many instances, it is desirable to have an electrical indication available to an alarm system control device whenever a valuable movable object is removed from its authorized location. For example, freight containers, trailer trucks, construction equipment, boats, and the like are frequently left unattended in open lots or alongside unattended piers where there is no need for them to be precisely located. It would be possible to provide connector cables incorporating special plugs, with corresponding jacks or sockets being provided on the movable articles to be protected, to complete an electrical circuit to an alarm system. Such plugs and sockets would be susceptible to short-circuits or corrosion of their contact points caused by exposure to the weather, however, and they would therefore present a serious problem of poor reliability.

Encapsulated magnetic reed switches have been used in intrusion alarm system sensor circuits in order to avoid exposure of switch contacts or electrical connector contacts to the weather, but as previously explained, the previous use of such magnetically operated switch assemblies has required an actuating magnet carried on a movable object to be relatively precisely located with respect to the magnetically operated switch. Previously known magnetically operated switch devices are therefore not readily useable to protect objects which are floating on water. Nor are all such devices well adapted for use on overhead doors, whose tracks often permit up to an inch or more of movement, on fence gates which often move in the wind, or to protect heavy equipment which must be left on a construction site between work shifts, in unpredictable positions.

In addition to being reliable, despite imprecise location or movability of the protected object, and despite exposure to the weather, a theft detection device needs to be easily operable and to be resistant to damage. Furthermore, such a device, if it includes a magnetically operated switch, needs to be resistant to deception, as by the use of hand-held magnets or by unauthorized removal of the actuating magnet, along with the switch assembly, from the object whose theft is to be detected by the device.

What is needed, therefore, is an improved electrical cable and connecting device for use in conjunction with a security alarm control system which is capable of reliable operation to detect removal of a portable or mobile object from its proper location without being susceptible to weather, and which does not require the object protected to be precisely located or completely stationary.

SUMMARY OF THE INVENTION

The present invention provides an improved connecting and sensing device for detecting unauthorized movement or theft of objects, especially portable and mobile objects, from their authorized locations. The device of the present invention includes a magnetically operated electrical switch device connectable to a theft detection alarm system circuit by flexible electrical conductors, preferably contained in an armored cable, and an actuating magnet which completes a physical connection between the object to be protected and an alarm control system, while magnetically actuating the switch device to a predetermined condition. In accomplishing such a physical connection the actuating magnet may optionally be fixedly attached to an object which is to be protected by the device, or it may be fixedly attached to a stationary object.

Provision is made to locate the magnetically operated switch device in a particularly desired place relative to the actuating magnet. Hence, the actuating magnet is preferably located within a socket, while the magnetically operated switch is contained within a switch housing which fits slidably within the socket. A quantity of ferromagnetic material is attached to the outer end of the switch housing so that the switch housing may be magnetically held in the socket by the actuating magnet. Preferably, the socket and the switch housing are cylindrical and the ferromagnetic material is in the form of a soft iron collar attached to one end of the switch housing, while the electrical conductors are connected through the other end of the switch housing.

A preferred magnetically operated switch for use in the device of the invention is a magnetic reed switch contained within the switch housing but located spaced slightly away from the soft iron collar attached to the end of the switch housing. When the switch housing is inserted into the socket far enough to bring the soft iron collar into proximity with the actuating magnet, a magnetic field is induced in and around the soft iron collar by the actuating magnet. This induced field causes the magnetic reed switch to actuate magnetically when the switch housing is located fully inserted in the socket. In a preferred embodiment, the socket is deep enough so that removal of the switch housing from the socket results in the magnetically operated switch moving far enough out of the magnetic field of the actuating magnet to allow the switch to become unactuated.

When the device is in use the magnetic attraction between the actuating magnet and the soft iron collar retains the switch housing in its proper location within the socket. The magnetic force of attraction is sufficient to resist ordinarily expected forces such as those exerted on the conductor cable by vibration, wind, and normal motion of a movable object such as a boat at its mooring place, when an adequate length of cable is provided to accomodate normally expected motion.

The actuating magnet may be secured in a desired location on a flat surface by fastening a mount holding only the actuating magnet in the desired location, while an outer housing which defines the socket fits over the magnet preventing access to the mount securing the magnet itself without prior removal of the outer housing. Removal of the outer housing in a mistaken understanding that its removal would also effect removal of the magnet results in displacement of the switch housing containing the magnetically operated switch from the actuating magnet's field. Consequently, the magnetically operated switch will become unactuated, providing an indication of an alarm situation to the alarm control system.

To enhance the resistance of the device to tampering, a small biasing magnet may be located within the switch housing in a position close to the magnetically operated switch, thus magnetically actuating the switch whenever the switch housing is not located in a suitably strong, properly polarized magnetic field. The biasing magnet is situated relative to the magnetically operated switch so that its field opposes and balances that of the actuating magnet, as felt by the magnetically operated switch when the switch housing is properly located in the socket associated with the actuating magnet. The magnetically operated switch is therefore unactuated when the switch housing is properly located within the socket. The device of the invention is thus usable to provide a magnetically balanced open-loop alarm system circuit. In this form of the device, as well, the actuating magnet retains the switch housing within the socket by attracting the ferromagnetic material associated with the switch housing.

It is therefore a principal objective of the present invention to provide a reliable electrical switch assembly for use in a security system theft detection circuit.

It is another objective of the present invention to provide a connecting and sensing device for an electrical theft detection circuit of an alarm system which is not susceptible to adverse weather conditions.

It is yet a further objective of the present invention to provide a method for detecting unauthorized movement of an object, including the steps of magnetically actuating a switch in an alarm circuit, magnetically retaining the switch in proximity to an actuating magnet, pulling the switch away from the actuating magnet in response to unauthorized movement of the object, and electrically detecting separation of the switch from the actuating magnet.

It is an important feature of the present invention that it includes a magnetically operated switch contained in a switch housing and an actuating magnet located within a socket, adapted for receiving the switch housing, which requires removal of the magnetically operated switch from the field of the actuating magnet when the switch housing is removed from the socket.

It is another important feature of the present invention that it includes a magnet holder assembly including a magnet mount for mounting the actuating magnet to the protected object, and a separate outer housing, defining the socket, which protectively covers the fasteners retaining the magnet mount, so that the magnetically operated switch is removed from the magnet field of the actuating magnet when the outer housing is removed from the object being protected.

It is a principal advantage of the present device that it provides apparatus and a method in which a magnetically operated switch can be used to detect unauthorized movement of objects which need not be located as precisely as was necessary for use of previously known magnetically operated devices for this purpose.

The foregoing objectives, features and advantages of the present invention will be more readily understood upon consideration of the following detailed description of the invention taken in conjunction with the accompanying drawings.

BRIEF DESCRIPTION OF THE DRAWINGS

FIG. 1 is a perspective view of an alarm system theft detection device embodying the present invention in use to detect removal of a bicycle from its proper location.

FIG. 2 is a sectional view, on an enlarged scale, of a magnetically operated switch assembly and socket included in the alarm system shown in FIG. 1, taken along line 2—2.

FIG. 3 is an exploded perspective view of a magnetically operated switch assembly and actuating magnet housing assembly which are another embodiment of the present invention.

DETAILED DESCRIPTION OF THE INVENTION

Figure 4:
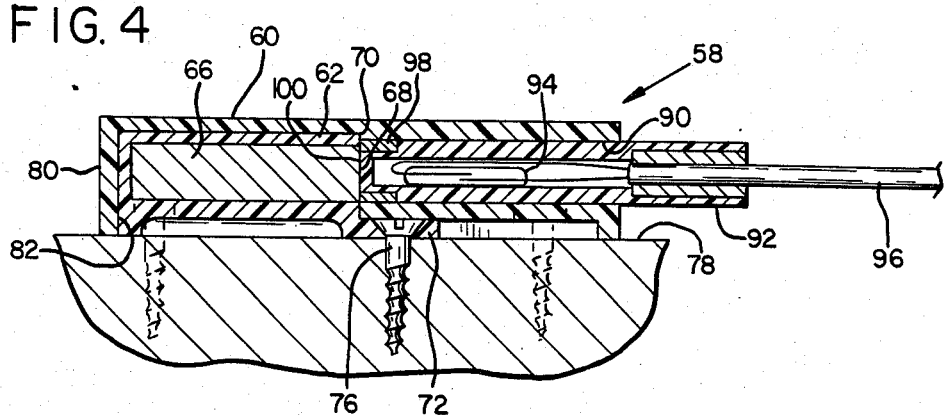
FIG. 4 is a sectional view taken along line 4—4 of the device shown in FIG. 3, showing the actuating magnet housing and socket assembly attached to an object.

Referring now to FIG. 1 of the drawings, a connecting and sensing device 10 embodying the present invention is shown being used to prevent undetected removal of a bicycle 12 from its proper location. Electrical conductors contained in a cable 14 connect the device 10 electrically to a control system 18 of an alarm system. Referring now also to FIG. 2, the cable 14 of the connecting and sensing device 10 is preferably an armor protected cable, which contains at least a pair of electrical conductors 20 and 22, connected to a magnetically operated switch such as the encapsulated magnetic reed switch 24. The magnetic reed switch 24 includes a pair of flexible reed contacts 26 and 28 which are of an electrically conductive ferromagnetic material.

The magnetically operated switch is fixedly located within a switch housing 30 which may be of a cylindrical tubular shape and may be made of a suitably tough and rigid plastics material. Within the switch housing 30 the encapsulated magnetic reed switch 24 and an end of the cable 14 may be securely fixed in place by a room temperature vulcanizing potting material. A quantity of a ferromagnetic material such as a soft iron collar 32 is fixedly attached to the switch housing 30, relatively close to the magnetic reed switch 24, and preferably at the outer end 34 of the switch housing 30. The reed contacts 26 and 28 and the collar 32 are all of ferromagnetic material having high permeability and low retentivity, so that magnetic fields are easily induced in them, yet quickly dissipate upon their removal from a magnetic field.

An actuating magnet 36 is fixedly located within a magnet holder 38. The magnet holder 38 is generally cylindrical in shape, and includes external threads 40 along its length and a flange 42 located at an outer end thereof. A nut 44 may be held on the outside of the magnet holder 38 by the threads 40 to retain the magnet holder in a location extending inwardly through a structural member such as a wall 46, leaving the flange 42 exposed. A threaded bore 54 is provided at the inner end 48 of the magnet holder 38 to receive a threaded bolt (not shown) for the same purpose, if desired.

The actuating magnet 36 is located within a cavity such as a socket 50 defined within the magnet holder 38, where it is fixed in place, as by adhesives. The socket 50 corresponds to the size of the switch housing 30, and is open through the flange 42 of the magnet holder 38, permitting the switch housing 30 to be slidably received therein with the collar 32 adjacent to an end 52 of the actuating magnet 36.

The cable 14, at a suitable distance from the switch housing 30, is fixedly secured within a bore 54 extending lengthwise through the magnet holder 38 generally parallel with the socket 50. The conductors 20 and 22 extend rearwardly unarmored from the inner end 48 of the magnet holder 38, to connect the sensing device 10 of the present invention to the alarm control system 18.

For example, the magnet holder 38 may be about 6 to 8 inches long and 1 inch in diameter with the flange 42 being 1½ inches in diameter. The socket 50 may be about ⅜ inch in diameter, with the switch housing 30 being slightly smaller in diameter to provide an easily slidable fit. The switch housing 30 may be about 2½ inches long and the collar 32 may be about ¼ inch long, when a magnetic reed switch 24 is used as the magnetically operated switch of the device. The distance between the collar 32 and the switch 24 depends on the strength of the actuating magnet and the field strength needed to operate the switch 24.

A connecting and sensing device 58 which is another embodiment of the present invention is disclosed in FIGS. 3 and 4. A magnet holder 60 of the device 58 includes a magnet mount 62. The magnet mount 62 defines a bore 64 for receiving an actuating magnet 66 so that an end 68 is flush with a front face 70 of the magnet mount 62. An ear 72 extends from the front face 70 of the magnet mount 62 and includes a hole 74 for receiving a fastener such as a screw 76 to fasten the magnet mount 62 to a flat surface 78 of an object whose unauthorized removal is to be detected by the sensor 58.

An outer housing 80, which is part of the magnet holder 60, includes a cavity 82 permitting the outer housing 80 to surround the magnet mount 62 and be fastened to the same flat surface 78 to which the magnet mount 62 is secured by the screw 76. A pair of flanges 84 and 86, located respectively along opposite sides of the outer housing 80, include holes 88 for receiving fasteners to attach the outer housing 82 to the same surface 78 of the object being protected by the sensor 58, with the outer housing 80 covering the magnet mount 62. A tubular socket 90 is defined in the outer housing 80, with its longitudinal axis approximately parallel with the surface 78, in a location aligned with the bore or cavity 64.

A switch housing 92 protectively contains a magnetically operated switch such as an encapsulated magnetic reed switch 94 which is electrically connected by a flexible cable 96 including electrical conductors (not shown), to a control circuit of an alarm system (not shown). As with the previously described switch housing 30, a collar 98, similar to the collar 32, is fixedly attached to an outer end 100 of the switch housing 92. The socket 90 is of an appropriate size and shape to receive the switch housing 92, with the collar 98 adjacent to the end 68 of the actuating magnet 66 when the outer housing 80 is installed surrounding the magnet mount 62, as may be seen in FIG. 4.

Figure 5:
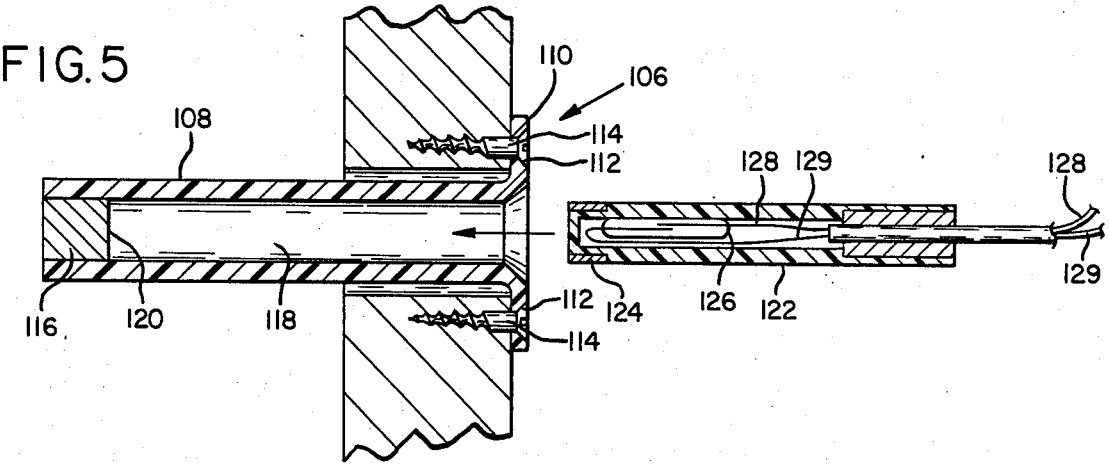
FIG. 5 is a sectional view of a magnetically operated switch assembly and an actuating magnet and socket assembly which are yet another embodiment of the present invention.

FIG. 5 discloses a connecting and sensing device 106 which is yet another embodiment of the present invention. The sensing device 106 includes a simple tubular cylindrical magnet holder 108. A radial flange 110 including a pair of screw holes 112 is located at one end of the magnet holder 108 to enable it to be fastened easily to a portable object through the use of fasteners such as screws 114. An actuating magnet 116 is adhesively secured in the magnet holder 108, which defines an interior tubular socket 118 which may be approximately ¼ inch in diameter and ¾ inch deep as measured between the end 120 of the actuating magnet 116 and the outer face of the flange 110.

A switch housing 122 is of a correspondingly small size and is slidably receivable within the socket 118. A soft iron or other ferromagnetic collar 124 fixedly attached at one end of the housing 122 may be 3/16 inch in length. A small encapsulated magnetic reed switch 126 or other magnetically operated switch is retained within the interior of the switch housing 122 by suitable potting material, while electrical conductors 128 and 129, connected with the terminals of the reed switch 126, extend outwardly from the end of the switch housing opposite the collar 124. Because of its small size the sensing device 106 is particularly well adapted for use with portable, pilferable items of high value such as television receiver sets and the like which are commonly provided in publicly accessible places.

Figure 6:
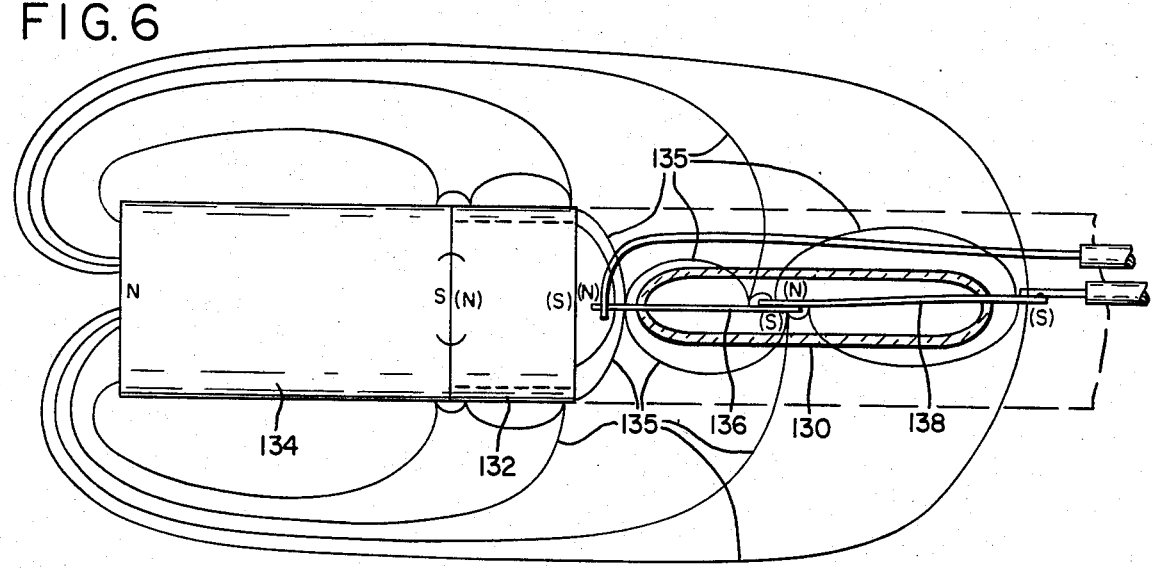
FIG. 6 is a schematic diagram illustrating the magnetic field distribution associated with a magnetically operated switch device embodying the present invention when the switch housing is located within the socket of the actuating magnet holder.
Figure 7:
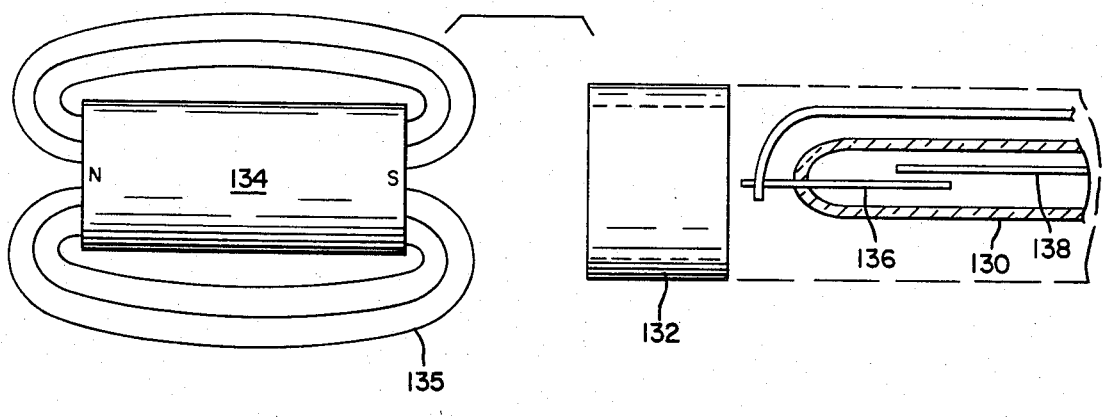
FIG. 7 is a schematic diagram illustrating the magnet field distribution associated with the actuating magnet of the device of FIG. 6 when the switch assembly is separated from its position within the socket.

Operation of the connecting and sensing devices 10, 58 and 106 of the present invention will be better understood by referring additionally to FIGS. 6 and 7 which show, in a simplified, partially schematic manner, the way in which such a device operates. In FIG. 6 an encapsulated magnetic reed switch 130 of the normally open type is associated with a quantity of ferromagnetic material 132 which is equivalent to the collars 32, 98, and 124. An actuating permanent magnet 134 provides a magnetic field which attracts the ferromagnetic material 132. Since the ferromagnetic material 132 is fixedly located with respect to the reed switch 130, magnetic retention of the ferromagnetic material 132 adjacent to the end of the actuating magnetic 134 also physically retains the reed switch 130 in a known location relative to the actuating magnet 134. When the ferromagnetic material 132 is adjacent to the actuating magnet 134, a magnetic field, indicated schematically by lines of force 135, is induced in the ferromagnetic material 132, and extends around it and the reed switch 130, inducing a further magnetic field concentration in the magnetic reeds 136 and 138 of the switch 130, causing them to attract one another and flex into physical and electrical contact with one another. This closes the electrical circuit through the reed switch 130, so long as the ferromagnetic material 132 is located properly within a sufficiently strong magnetic field, such as that of the actuating magnet 134.

Thus, when the switch housings of the previously described sensors 10, 58 and 106 embodying the present invention are located within the sockets 50, 90 and 118 of the respective magnet holders, so that the ferromagnetic collars 32, 98 and 124 are adjacent to the respective actuating magnets, the switches will be in a magnetically actuated state. This state of magnetic actuation can be detected electrically by a properly designed control circuit such as that of the alarm control system 18, when the device is electrically connected thereto. Removal of the switch housing of any of the above-described connecting and sensing devices from the socket (not shown in FIGS. 6 and 7, but functionally equivalent to the sockets 50, 90 and 118) of the associated magnet holder, however, moves the respective reed switch and ferromagnetic material such as the collar 132 so far from the magnetic field, such as that of the actuating magnet 134, that there is no longer a sufficiently strong induced magnetic attraction between the magnetic reeds 136 and 138 to maintain contact, and the elastic bias of the reeds 136 and 138 separates them from one another, breaking the electrical circuit, before the switch housing can be removed fully from the socket in which the actuating magnet is located. This operation is ensured by use of ferromagnetic material which has a high enough magnetic permeability to ensure that the field of an actuating magnet 135 extends through the ferromagnetic material 132 and induces a sufficiently strong field in the vicinity of the reed switch 130, and by ensuring that the magnetic retentivity of the ferromagnetic material 132 is low enough so that the magnetism induced in the ferromagnetic material 132 will be dissipated before the ferromagnetic material 132 and reed switch 130 have been completely withdrawn from the socket adjacent to the actuating magnet 134.

The sensing device of the present invention may be installed in association with an alarm system circuit in several ways. First, the alarm system may be installed in a building, and the connecting and sensing device 10 of FIGS. 1 and 2 may be used by looping the cable 14 through or around a portion of the object to be protected against unauthorized removal, as shown with the bicycle 12 in FIG. 1. Alternatively, the alarm system might be mounted permanently on a movable object such as a motorcycle, and the cable 14 might be wrapped around an immovable object such as a lamp post when parking such a motorcycle.

The magnet holder 60 is adapted to be mounted against a flat surface such as a surface 78 on the exterior of a freight container or a trailer truck box, while the cable 96 is connected to an alarm system permanently installed in an area where freight containers or the like are routinely parked. Unauthorized movement of a freight container once the switch housing 92 has been inserted into the socket 90 would be detected when movement of the container resulted in the cable 96 pulling the switch housing 92 from the socket 90, causing the switch 94 to become magnetically unactuated. An attempt to circumvent the sensing device by removing the magnet holder 60 from the freight container or trailer truck would also result in magnetic unactuation of the switch 94, since the magnet mount 62 is separately attached beneath the outer housing 80. Removal of the outer housing 80 from the freight container would cause displacement of the magnetically actuated switch 94 away from the actuating magnet 68 resulting in interruption of the magnetic actuation of the switch 94.

Similarly, the switch housing 122 could be electrically and physically connected to a permanently installed alarm system. Removal of a portable object to which the magnet holder 108 is attached would result in the switch housing 122 being withdrawn from the magnet holder 108, causing the magnetic reed switch 126 to become unactuated.

Figure 8:
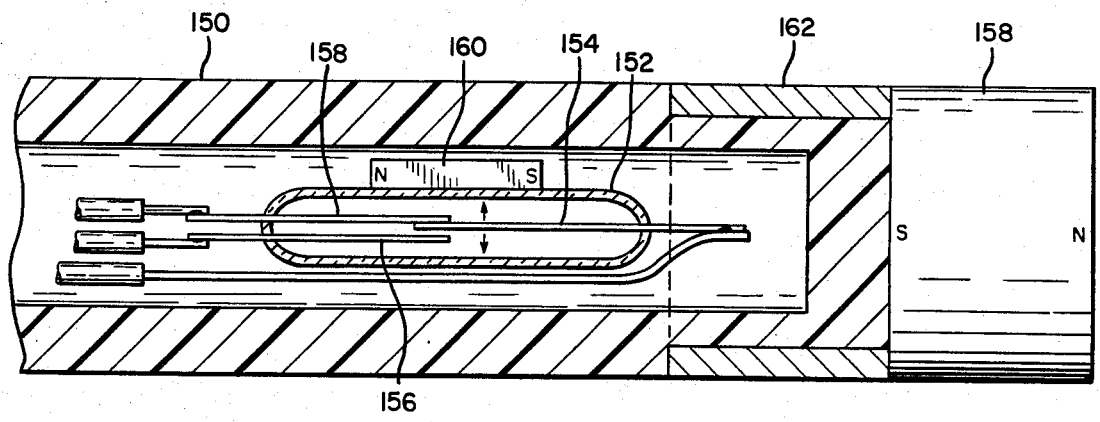
FIG. 8 is a fragmentary sectional view of a high security magnetically operated switch assembly according to the present invention, including a biasing magnet.

A higher-security embodiment of the sensing device of the invention, which is more difficult than the previously-described devices to circumvent with the use of additional magnets, is shown in a sectional view in FIG. 8. A switch housing 150, shown fragmentarily, includes a single-pole, double-throw, encapsulated magnetic reed switch 152 having a pair of reed contacts 154 and 156 which are of a ferromagnetic electrically conductive material, and a third reed 158 which is of a substantially non-magnetic electrically conductive material. The magnetic reed contact 154 is normally biased by its own elasticity into physical and electrical contact with the non-magnetic reed 158, in the absence of a magnetic field. A small biasing magnet 160, however, provides a magnetic field of sufficient strength to magnetically actuate the reed switch 152, bringing the magnetic reed contacts 154 and 156 into electrical contact with one another, in the absence of an opposing magnetic field of equal strength created by an external magnet such as the actuating magnet 158. A quantity of ferromagnetic material having high permeability and low retentivity, such as a soft iron collar 162, is fixedly attached to the switch housing 150 and performs the same functions of physical retention and magnetic force field conduction as the ferromagnetic material 132 of FIGS. 6 and 7. A biasing magnet could be used similarly in any of the previously-described sensor devices 10, 60 or 106 according to the present invention, within the limitations of the physical size of the respective switch housing 30, 92 or 122.

In the higher security device shown in FIG. 8, insertion of the switch housing into an appropriate socket results in a magnetic field being induced in the collar 160 by the magnetic field of the actuating magnet 158. However, the actuating magnet 158 is stronger than the biasing magnet 160 and is located in its magnet holder oriented to produce an opposite magnetic field felt by the magnetic reed contacts 154 and 156 with strength approximately equal to that of the magnetic field of the biasing magnet 160. This produces a net magnetic field in the vicinity of the magnetic reeds 154 and 156 which is too small to maintain magnetic actuation of the magnetic switch 152, and the reed 154 will be elastically moved into contact with the non-magnetic reed 158, producing an electrically detectable indication that conditions are normal. Attempts to use a hand-held magnet to imitate the actuating magnet, however, are unlikely to succeed, since too strong a magnetic field will overcome the biasing magnet 160 and close the magnetic reed contacts 154 and 156.

It will be appreciated that, besides magnetic reed switches, other types of magnetically operated switches will also be usable in a sensing device according to the invention. For example, Hall effect magnetically operated semiconductor switching devices, or mercury-bellows type magnetically operated switches would also be useable herein.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A device for incorporation in a physical security alarm system for detecting removal of an object from a predetermined location, comprising:
   (a) electrical switch means responsive to a magnetic field for changing state between a first state and a second state in response to the presence of a predetermined magnetic field strength;
   (b) a quantity of ferromagnetic material associated with said switch means and fixedly located with respect to said switch means, at a predetermined distance therefrom;
   (c) an actuating magnet selectively located with respect to an object present in said predetermined location, whose removal it is desired to detect, said actuating magnet having sufficient field strength to hold said quantity of ferromagnetic material and said switch means in a predetermined position relative to said actuating magnet and to provide said predetermined magnetic field strength to said switch means when said ferromagnetic material and said switch means are in said predetermined position;
   (d) electrical conductor means electrically connected with said switch means for connecting said switch means electrically to an alarm system circuit to make possible electrical detection of the state of said switch means; and
   (e) connecting means interconnecting said switch means with said predetermined location, for separating said switch means and said quantity of ferromagnetic material from said predetermined position upon removal of said object from said predetermined location.

2. The device of claim 1, wherein said first state comprises said switch means being magnetically actuated and said second state comprises said switch means being magnetically unactuated, said switch means including a magnetic reed switch and a biasing magnet fixedly located and oriented with respect to said magnetic reed switch so that the field of said biasing magnet opposes that of said actuating magnet, producing a resultant magnetic field in the vicinity of said magnetic reed switch which is less than sufficient to magnetically actuate said magnetic reed switch, when said switch means and said ferromagnetic material are located in said predetermined position relative to said actuating magnet.

3. The device of claim 2 wherein the field strength of said biasing magnet and its location relative to said magnetic reed switch cause said magnetic reed switch to be magnetically actuated when said switch means is removed from proximity with said actuating magnet.

4. A device for incorporation in a physical security alarm system for detecting removal of an object from a predetermined location, comprising:

(a) electrical switch means responsive to a magnetic field for changing state between an actuated state and an unactuated state in response to the presence of a predetermined magnetic field strength;
   (b) a quantity of ferromagnetic material associated with said switch means and fixedly located with respect to said switch means at a predetermined distance therefrom;
   (c) an actuating magnet having sufficient field strength to hold said ferromagnetic material and said switch means in a predetermined position relative to said actuating magnet and to provide said predetermined magnetic field strength to said switch means when said ferromagnetic material and said switch means are in said predetermined position;
   (d) magnet holder means for mounting said actuating magnet in a predetermined mounting location;
   (e) electrical conductor means electrically connected with said switch means for connecting said switch means electrically to an alarm system circuit to make possible electrical detection of the state of said switch means;
   (f) switch housing means for protectively containing said switch means, said switch means being located within said switch housing means and said ferromagnetic material being fixedly attached to said housing means; and
   (g) connecting means interconnected with said switch housing means, for separating said switch means and said ferromagnetic material from said predetermined position as a result of removal of said object from said predetermind location.

5. The device of claim 4 including switch housing means for protectively containing said switch means, said switch means being located within said switch housing means and said ferromagnetic material being fixedly attached to said housing means.

6. The device of claim 5, said magnet holder means including means defining a socket for receiving said ferromagnetic material and said switch means in said predetermined position relative to said actuating magnet.

7. The device of claim 5, wherein said switch housing means is elongate and said ferromagnetic material is fixedly attached to one end thereof, said magnet holder means including means defining a socket of suitable size and shape for receiving said one end of said switch housing and said ferromagnetic material therein adjacent to said actuating magnet.

8. The device of claim 7, wherein said switch housing means is cylindrical, said socket is tubular and includes an inner end, and said actuating magnet is fixedly located adjacent said inner end.

9. The device of claim 7, including means for attaching said magnet holder means to a flat surface with a longitudinal axis of said tubular socket oriented generally parallel with said flat surface.

10. The device of claim 7, said magnet holder means being generally cylindrical and defining an outer end of said socket, said magnet holder including flange means, located at the outer end of said socket and extending radially outward therefrom, for establishing a mounting location of said magnet holder means relative to an object wherein said magnet holder means extends into said object.

11. The device of claim 4 wherein said magnet holder means includes elongate body means defining a socket for receiving said switch means therein, said magnet holder means further defining exterior thread means extending about a portion thereof for receiving a threaded fastener for retaining said magnet holder means in a recessed mounting location.

12. A device for incorporation in a physical alarm system for detecting removal of an object from a predetermined location, comprising:
 (a) electrical switch means responsive to a magnetic field for changing state between a first state of magnetic actuation and a second state of magnetic actuation in response to the presence of a predetermined magnetic field strength;
 (b) a quantity of ferromagnetic material associated with said switch means and fixedly located a predetermined distance therefrom;
 (c) an actuating magnet having sufficient field strength to hold said quantity of ferromagnetic material and said switch means in a predetermined position relative to said actuating magnet and to provide said predetermined magnetic field strength to said switch means when said ferromagnetic material and said switch means are in said predetermined position;
 (d) magnet holder means for mounting said actuating magnet in a predetermined location;
 (e) electrical conductor means electrically connected with said switch means for connecting said switch means electrically to an alarm system circuit to make possible electrical detection of the state of said switch means; and
 (f) elongate switch housing means for protectively containing said switch means, said switch means being located within said switch housing means and said quantity of ferromagnetic material being fixedly attached to one end of said switch housing means, said magnet holder means including means defining a socket of suitable size, depth, and shape for receiving said one end of said switch housing means and said quantity of ferromagnetic material together therein, adjacent said actuating magnet, the depth of said socket being at least great enough that removal of said switch housing means from said socket requires separation of said switch means and said quantity of ferromagnetic material from said actuating magnet by a distance sufficient to vary the magnetic field strength in the vicinity of said switch means to a level which is insufficient to maintain said switch means in said second state of magnetic actuation.

13. The device of claim 12 wherein said switch housing means is cylindrical, said socket is tubular and includes an inner end, and said actuating magnet is fixedly located adjacent said inner end of said socket.

14. The device of claim 12 wherein said socket is tubular, including means for attaching said magnet holder means to a flat surface with a longitudinal axis of said socket oriented generally parallel with said flat surface.

15. The device of claim 12, said magnet holder means being generally cylindrical and defining an outer end of said socket, said magnet holder including flange means, located at the outer end of said socket and extending radially outwardly therefrom, for establishing a position of said magnet holder means relative to an object wherein said magnet holder means extends into said object.

16. A device for incorporation in a physical alarm system for detecting removal of an object from a predetermined location, comprising:
 (a) electrical switch means, responsive to a magnetic field, for changing state between an actuated state and an unactuated state in response to the presence of a predetermined magnetic field strength;
 (b) a quantity of ferromagnetic material associated with said switch means and fixedly located a predetermined distance therefrom;
 (c) an actuating magnet having sufficient field strength to hold said quantity of ferromagnetic material and said switch means in a predetermined position relative to said actuating magnet and to provide said predetermined magnetic field strength to said switch means when said ferromagnetic material and said switch means are in said predetermined position;
 (d) electrical conductor means electrically connected with said switch means for connecting said switch means electrically to an alarm system circuit to make possible electrical detection of the state of said switch means;
 (e) magnet holder means for mounting said actuating magnet in a predetermined location;
 (f) first mounting means, included in said magnet holder means, for attaching said actuating magnet to an object;
 (g) outer housing means, included in said magnet holder means, for preventing access to said first mounting means without prior removal of said outer housing means therefrom;
 (h) socket means defined in said outer housing means, for receiving said ferromagnetic material and said switch means in said predetermined position relative to said actuating magnet; and
 (i) a cover portion included in said outer housing means and extending around said first mounting means.

17. A device for detecting removal of an object from a predetermined location, comprising:
 (a) a magnetic reed switch;
 (b) electrical conductor means electrically connected with said reed switch for connecting said reed switch with an electrical circuit;
 (c) an acutating magnet;
 (d) magnet holder means for securing said actuating magnet to an object whose unauthorized removal from a predetermined location is to be detected;
 (e) a quantity of ferromagnetic material fixed in a predetermined position with respect to said magnetic reed switch, the amount of said ferromagnetic material and the field strength of said actuating magnet being sufficient to provide a predetermined magnetic field surrounding said magnetic reed switch and to hold said quantity of ferromagnetic material adjacent said actuating magnet while said object remains in said predetermined location despite forces normally expected to be applied to said magnetic reed switch and said quantity of ferromagnetic material while said object remains in said predetermined location;
 (f) elongate flexible attachment means for physically connecting said reed switch to said predetermined location and pulling said reed switch away from said actuating magnet in response to removal of said object from said predetermined location.

18. A method for monitoring the security of an object, comprising:
 (a) removably attaching a flexible elongate connecting member between a movable object whose security is to be monitored and a fixed object;
 (b) magnetically maintaining attachment of said flexible elongate connecting member between said movable object and said fixed object by using an actuating magnet to magnetically retain an end of said elongate connecting member in a predetermined position adjacent said actuating magnet;
 (c) operating a magnetically actuated switch to a first predetermined state in response to location of said end of said connecting member in said predetermined position;
 (d) operating said magnetically actuated switch to a second predetermined state in response to removal of said end of said elongate connecting member from said predetermined position;
 (e) electrically monitoring whether said magnetically actuated switch is in said first or said second predetermined state; and
 (f) automatically providing a predetermined response to operating said switch to said second predetermined state.

19. The method of claim 18 including the further step of requiring said magnetically actuated switch to be moved far enough from the actuating magnet to operate said magnetically actuated switch to said second predetermined state, in order to effect removal of said end of said elongate connecting member from said predetermined position adjacent said actuating magnet.

* * * * *

UNITED STATES PATENT AND TRADEMARK OFFICE
CERTIFICATE OF CORRECTION

PATENT NO. : 4,536,754

DATED : August 20, 1985

INVENTOR(S) : Thomas J. Holce and Charles M. Huckins

It is certified that error appears in the above-identified patent and that said Letters Patent is hereby corrected as shown below:

Col. 1, Line 24  Change "appropriate" to --appropriately--.

Col. 4, Line 40  Change "magnet" to --magnetic--.

Col. 7, Line 34  Change "135" to --134--.

Signed and Sealed this

Twelfth Day of August 1986

[SEAL]

Attest:

DONALD J. QUIGG

*Attesting Officer*  *Commissioner of Patents and Trademarks*